United States Patent
Kubo et al.

(10) Patent No.: US 8,760,717 B2
(45) Date of Patent: Jun. 24, 2014

(54) INTERMEDIATE TRANSFER BELT AND IMAGE FORMING APPARATUS

(75) Inventors: Hidetaka Kubo, Kanagawa (JP); Jun Aoto, Kanagawa (JP); Kenichi Mashiko, Kanagawa (JP); Sayaka Katoh, Kanagawa (JP); Shinichi Nitta, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 161 days.

(21) Appl. No.: 13/419,808

(22) Filed: Mar. 14, 2012

(65) Prior Publication Data

US 2012/0262739 A1   Oct. 18, 2012

(30) Foreign Application Priority Data

Mar. 18, 2011   (JP) ................. 2011-061390

(51) Int. Cl.
| | | |
|---|---|---|
| G06F 15/00 | (2006.01) | |
| G06K 1/00 | (2006.01) | |
| H04N 1/60 | (2006.01) | |
| G06K 15/02 | (2006.01) | |
| G06F 3/12 | (2006.01) | |
| G06K 15/00 | (2006.01) | |

(52) U.S. Cl.
CPC ............ *G06K 15/02* (2013.01); *G06F 3/1203* (2013.01); *G06K 15/4025* (2013.01)
USPC .......................................... 358/1.9; 358/1.1

(58) Field of Classification Search
CPC ... G06K 15/02; G06K 15/4025; G06F 3/1203
USPC ................................... 358/1.1, 1.9
See application file for complete search history.

(56) References Cited

U.S. PATENT DOCUMENTS

| | | | |
|---|---|---|---|
| 5,600,420 A | 2/1997 | Saito et al. | |
| 5,666,193 A | 9/1997 | Rimai et al. | |
| 6,101,360 A | 8/2000 | Hara et al. | |
| 6,589,700 B2 | 7/2003 | Tsutsumi et al. | |
| 7,361,400 B2 * | 4/2008 | Shimamura et al. | 428/323 |
| 7,776,427 B2 | 8/2010 | Ikeda et al. | |
| 2002/0064720 A1 | 5/2002 | Tsutsumi et al. | |
| 2005/0214036 A1 | 9/2005 | Embry et al. | |

FOREIGN PATENT DOCUMENTS

| | | |
|---|---|---|
| EP | 2463726 A1 | 6/2012 |
| JP | 7-234592 | 9/1995 |
| JP | 9-230717 | 5/1997 |
| JP | 3019781 | 1/2000 |
| JP | 2002-162767 | 6/2002 |
| JP | 2004-191659 | 7/2004 |
| JP | 2006-47609 | 2/2006 |
| JP | 2007-328165 | 12/2007 |

(Continued)

OTHER PUBLICATIONS

European search report dated Oct. 16, 2012 in connection with corresponding European patent application No. 12159724.9.

*Primary Examiner* — Douglas Tran
(74) *Attorney, Agent, or Firm* — Cooper & Dunham LLP (57) ABSTRACT

To provide an intermediate transfer belt, containing a base, an elastic layer formed on the base, and spherical particles deposited on a surface of the elastic layer, in which wherein the elastic layer has micro rubber hardness of 40° or lower in the environment of 10° C. and 15% RH, and the intermediate transfer belt is designed to be mounted in an image forming apparatus.

10 Claims, 4 Drawing Sheets

(56) References Cited

FOREIGN PATENT DOCUMENTS

| | | |
|---|---|---|
| JP | 2009-25421 | 2/2009 |
| JP | 2009-75154 | 4/2009 |
| JP | 4430892 | 12/2009 |
| WO | WO2011/016500 | 2/2011 |

* cited by examiner

FIG. 6C

INTERMEDIATE TRANSFER BELT AND IMAGE FORMING APPARATUS

BACKGROUND OF THE INVENTION

1. Field of the Invention

The present invention relates to an intermediate transfer belt used for an image forming apparatus, e.g. a photocopier, facsimile, and printer, and to an image forming apparatus equipped with the intermediate transfer belt.

2. Description of the Related Art

Image forming apparatuses using an intermediate transfer belt as an intermediate transfer member are effective as color image forming apparatuses or multi-color image forming apparatuses, which outputs color prints by successively laminating and transferring a plurality of color images formed by color image information or multi-color image information. As for this type of the image forming apparatus, various image forming apparatuses using an intermediate transfer belt formed of a resin such as a polyimide resin or polyamide imide resin have been conventionally provided.

The intermediate transfer belt formed of the resin generally has high hardness. Therefore, the toner image (especially a center part of a character) receives concentration of stress to thereby prone to cause transfer failures called hollow defects of characters, for example, in a step for primary transferring a toner image from a photoconductor serving as an image bearing member to an intermediate transfer belt, and in a step for secondary transferring a toner image from an intermediate transfer belt to a recording medium.

As one of the methods for solving the problems of hollow defects of characters, giving elasticity to a surface of an intermediate transfer belt has been proposed. Specifically, by giving elasticity to a surface of an intermediate transfer belt, the surface of the intermediate transfer belt freely deforms corresponding to a thickness of a toner image so that the stress concentration to the toner image is reduced to thereby improve the problem of the transfer failure. Accordingly, the one in which an elastic layer formed of a flexible material such as a rubber is formed on a base has been used as an intermediate transfer belt for solving the problem of the transfer failure.

If the surface of the intermediate belt is the elastic layer, however, the lowest layer of the toner transferred from the photoconductor to the surface of the intermediate transfer belt adheres to the surface of the intermediate transfer belt due to the tackiness of the elastic layer, the adhered toner remains on the surface of the intermediate transfer belt without being transferred to a recording medium. Therefore, insufficient image density due to reduced transfer efficiency of the toner from the intermediate transfer belt to a recording medium, or image failures due to hollow defects of images occur.

To solve the aforementioned problem, Japanese Patent Application Laid-Open (JP-A) No. 07-234592 discloses an image forming apparatus equipped with an intermediate transfer belt that contains a base, an elastic layer formed on the base, and particles deposited on a surface of the elastic layer. By depositing particles on the surface of the elastic layer of the intermediate transfer belt, an exposed area of the surface of the elastic layer reduces to thereby reduces the tackiness of the elastic layer. Therefore, an amount of the toner remained on the intermediate transfer belt during transferring reduces, and the transfer efficiency improves.

Depending on the hardness of the intermediate transfer belt or the shapes of the particles deposited on the elastic layer, sufficient flexibility may not be attained, or the tackiness of the elastic layer may not be reduces. As a result, excellent transfer ability may not be attained. Especially, use of paper having irregularities on its surface has been currently increased not only use of common smooth paper. Therefore, the correspondence of the elastic layer to the irregularities on the paper becomes poor unless the elastic layer of the intermediate transfer belt elastic layer has sufficient flexibility. If the elastic layer has the poor correspondence, the density of the recess parts is lower than the density of the protruding parts in the image transferred from the intermediate transfer belt to the paper having irregularities on its surface, to thereby form uneven densities of the image corresponding to the irregularities of the surface.

SUMMARY OF THE INVENTION

The present invention aims to solve the aforementioned various problems in the art, and achieve the following object. Namely, an object of the present invention is to provide an intermediate transfer belt capable of giving excellent transfer properties without causing density unevenness in an image transferred onto a recording medium a surface of which has irregularities, and to provide an image forming apparatus equipped with the intermediate transfer belt.

The means for solving the aforementioned problems is as follow:
An intermediate transfer belt of the invention, contains:
a base;
an elastic layer formed on the base; and
spherical particles deposited on a surface of the elastic layer,
wherein the elastic layer has micro rubber hardness of 40° or lower in the environment of 10° C. and 15% RH, and the intermediate transfer belt is designed to be mounted in an image forming apparatus.

As clearly explained through the experiments described later, the intermediate transfer belt of the present invention can attain excellent transfer ability without resulting uneven density in an image transferred from the intermediate transfer belt to a recording medium having irregularities on its surface, because the intermediate transfer belt, which is used for an image forming apparatus, has a base, an elastic layer formed on the base, and spherical particles deposited on a surface of the elastic layer, in which the elastic layer has micro rubber hardness of 40° or lower in the environment of 10° C. and 15% RH.

The present invention exhibits an excellent effect that excellent transfer properties can be provided without causing density unevenness in an image transferred onto a recording medium a surface of which has irregularities.

DETAILED DESCRIPTION OF THE INVENTION (Image Forming Apparatus)

The image forming apparatus of the present invention contains an image bearing member configured to form a latent image thereof and to bear a toner image, a developing unit configured to develop the latent image formed on the image bearing member with a toner to form a toner image, an intermediate transfer member to which the toner image developed by the developing unit is primary transferred, and a transferring unit configured to secondary transfer the toner image borne on the intermediate transfer member to a recording medium, and may further contain appropriately selected other units, such as a dielectrification unit, a cleaning unit, a recycling unit, and a controlling unit, if necessary. As for the intermediate transfer member, the intermediate transfer belt of the present invention, which will be described later, is used.

The image forming apparatus is preferably a full color image forming apparatus in which a plurality of latent image bearing members each having a developing unit of a single color are tandemly provided.

A seamless belt for use in a belt construction part mounted in the image forming apparatus of the present invention will be more specifically explained hereinafter with reference to the schematic partial views. Note that, these schematic views or diagrams illustrate one Example, and the present invention is not limited to these views or diagrams.

Figure 2:
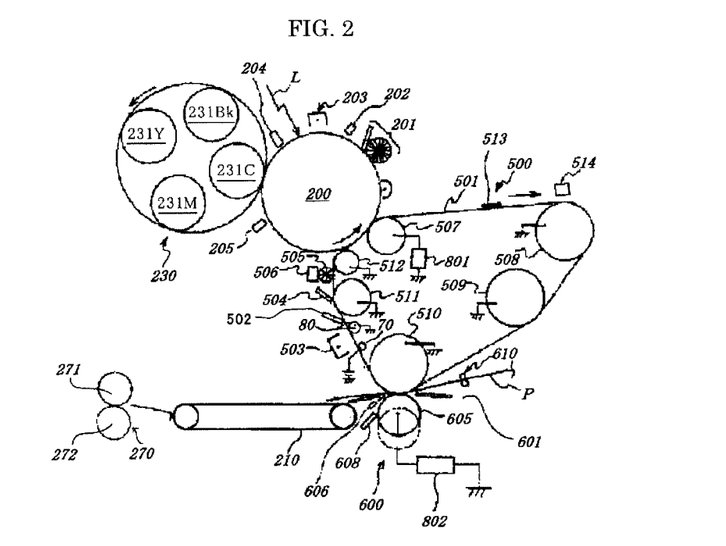
FIG. 2 is a schematic partial view illustrating one Example of the image forming apparatus of the present invention.

FIG. 2 is a schematic diagram illustrating a main part of an image forming apparatus equipped with the intermediate transfer belt of the present invention, which is a seamless belt produced by the production method described later.

The intermediate transfer unit 500 including a belt member, as illustrated in FIG. 2, contains an intermediate transfer belt 501, which is an intermediate transfer member, supported with a plurality of rollers with tension. In the surrounding area of the intermediate transfer belt 501, a secondary transfer bias roller 605 which is a secondary transfer charging unit of the secondary transfer unit 600, a belt cleaning blade 504 which is an intermediate transfer member cleaning unit, and a lubricant application brush 505 which is a lubricant applying member of a lubricant application unit are arranged to face the intermediate transfer belt 501.

Moreover, a position detection mark, which is not illustrated in the drawing, is provided on a circumference surface or internal circumference surface of the intermediate transfer belt 501. In the case where the position detection mark is provided on the circumference surface of the intermediate transfer belt 501, it is provided so that the position detection mark avoids the region where the belt cleaning blade 504 passes, and therefore there may be a difficulty in designing to provide the position detection mark. In such case, the position detection mark may be provided in the internal circumference surface of the intermediate transfer belt 501. An optical sensor 514 serving as a mark detection sensor is provided between the primary transfer bias roller 507 and belt driving roller 508 around which the intermediate transfer belt 501 is supported.

The intermediate transfer belt 501 is supported around the primary transfer bias roller 507 serving as a primary transfer charge applying unit, the belt driving roller 508, a belt tension roller 509, a secondary transfer counter roller 510, a cleaning counter roller 511, and feedback current detection roller 512. Each of these rollers is formed of an electrically conductive material, and each roller is earthed other than the primary transfer bias roller 507. Transfer bias is applied to the primary transfer bias roller 507, current or voltage of the transfer bias is controlled by the primary transfer power source 801 to a certain value depending on the number of toner images superimposed. The primary transfer power source 801 is controlled to give a constant current or constant voltage.

The intermediate transfer belt 501 is driven in the direction shown with the arrow by the belt driving roller 508 which is rotatably driven in the arrow direction by a driving motor not shown in the diagram.

This belt member, the intermediate transfer belt 501, is generally a semiconductor or an insulator, and has a single layer structure or multi-layer structure. In the present invention, a seamless belt is preferably used, and use of the seamless belt in the present invention improves the durability thereof and realizes formation of excellent images.

Moreover, the intermediate transfer belt 501 is designed to be larger than the maximum size of the feedable sheet so that toner images formed on the photoconductor drum 200 are superimposed thereon.

A secondary transfer bias roller 605, which is a secondary transferring unit, is mounted detachably from the circumference surface of the intermediate transfer belt 501 where supported by the secondary transfer counter roller 510, by a separation system as a separating unit that will be described later. The secondary transfer bias roller 605 is provided to nip a transfer paper P, which is a recording medium, with the part of the intermediate transfer belt 501 supported by the secondary transfer counter roller 510, and transfer bias of predetermined current is applied to the secondary transfer bias roller 605 by a secondary transfer power source 802 which is controlled to provide a constant current.

The registration roller 610 is configured to feed the transfer paper P, which is a transfer medium, to the space between the secondary transfer bias roller 605 and the intermediate transfer belt 501 supported by the secondary transfer counter roller 510 with the predetermined timing. Moreover, a cleaning blade 608, which is a cleaning unit, is provided to be contact with the secondary transfer bias roller 605. The cleaning blade 608 is configured to remove depositions on a surface of the secondary transfer bias roller 605 to clean.

Once a cycle of image formation is started in the color photocopier of the aforementioned structure, the photoconductor drum 200 is rotated in the anticlockwise direction shown with the arrow by a driving motor, and the formation of a Bk (black) toner image, the formation of a C (cyan) toner image, the formation of a M (magenta) toner image, and the formation of a Y (yellow) toner image are performed on the photoconductor drum 200. The intermediate transfer belt 501 is rotated in the clockwise direction shown with the arrow by the belt driving roller 508. Along with the rotation of the intermediate transfer belt 501, the primary transfer of the Bk toner image, the C toner image, the M toner image, and the Y toner image was performed by the transfer bias which is the voltage applied by the primary transfer bias roller 507, and the toner images are finally superimposed on the intermediate transfer belt 501 in the order of Bk, C, M, and Y to form a composite toner image.

The formation of the aforementioned Bk toner image is performed, for example, in the following manner.

In FIG. 2, a charger 203 uniformly charges a surface of the photoconductor drum 200 with negative charges to the predetermined electric potential by corona discharge. Based on the belt mark detection signal, the timing is determined, and raster-scan exposure is performed with laser light by an optical unit not illustrated in the drawing based on the Bk color image signal. When the exposure is performed with the raster image, the area of the uniformly charged surface of the photoconductor drum 200 where the laser light is exposed loses the charge proportional to the exposure light volume, to thereby form a Bk electrostatic latent image. With this Bk electrostatic latent image, the negatively charged Bk toner on the Bk developing roller of the developing device 231 is brought into contact. As a result, the toner is not deposited on the area of the photoconductor drum 200 where the charge remains, and the toner is adsorbed on the area thereof where no charge remains, i.e. the area exposed to the light, to thereby form a Bk toner image identical to the electrostatic latent image.

The Bk toner image formed on the photoconductor drum 200 in this manner is primary transferred to the circumference surface of the intermediate transfer belt 501 driven and rotated at the same speed as the rotation of the photoconductor drum 200 in contact with the photoconductor drum 200. The small amount of the untransferred residual toner remained on the surface of the photoconductor drum 200 after the primary transfer is cleaned by a photoconductor drum cleaning device 201 to ready photoconductor drum 200 for the next use. After the Bk image formation, the photoconductor drum 200 proceeds to a C image formation, and a color scanner starts reading the C image data at the predetermined timing. By exposing to laser light based on the C image date, a C electrostatic latent image is formed on a surface of the photoconductor drum 200.

After the bottom edge of the Bk electrostatic latent image passes through, but before the top edge of the C electrostatic latent image reaches, a rotational operation of a revolver developing unit 230 starts, and a developing device 231C is set in a developing position to develop the C electrostatic latent image with a C toner. Thereafter, developing is continued in the C electrostatic latent image region, but at the time when the bottom edge of the C electrostatic latent image passes though, the rotational operation of the revolver developing unit is carried out, in the same manner as in the previous developing device 231Bk, to move the following developing device 231M in the developing position. Similarly to the earlier, this operation is completed before the top edge of the following Y electrostatic latent image reaches the developing position. Note that, the image forming steps of M and Y are identical to those of Bk and C in terms of the operations for reading color image data, forming an electrostatic latent image, and developing, and thus the explanations thereof are omitted.

The Bk, C, M, Y toner images successively formed on the photoconductor drum 200 are successively subjected to positioning, and then primary transferred onto the same surface of the intermediate transfer belt 501. As a result of this, the toner images in which the toner images of four colors at maximum are superimposed are formed on the intermediate transfer belt 501. Meanwhile, transfer paper P is fed from a paper feeding section such as a transfer paper cassette or manual feeding tray at the timing when the aforementioned image forming operation starts, and the transfer paper P stands by at the nip between the registration rollers 610.

Then, the registration rollers 610 are driven so as to match the top edge of the transfer paper P with the top edge of the toner images when the top edge of the toner images on the intermediate transfer belt 501 reaches the secondary transfer section at which a nip between the intermediate transfer belt 501 supported by the secondary transfer counter roller 510 and the secondary transfer bias roller 605 is formed, and the transfer paper P is transported along the transfer paper guide plate 601 to thereby perform alignment registration of the transfer paper P and the toner images.

As the transfer paper P passes through the secondary transfer section in the aforementioned manner, the four color toner images on the intermediate transfer belt 501 are collectively transferred (secondary transferred) onto the transfer paper P by transfer bias which is the voltage applied to the secondary transfer bias roller 605 by the secondary transfer power source 802. The transfer paper P is then transported along the transfer paper guide plate 601, and is subjected to diselectrification by passing through a transfer paper diselectrification charger 606 formed of a diselectrification needle and provided at the downstream of the secondary transfer section. Thereafter, the transfer paper P is sent to a fixing device 270 by a belt conveying device 210, which is a belt component. Then, the toner images are fused and fixed on the transfer paper P at the nip between the fixing rollers 271, 272 of the fixing device 270, followed by discharging the transfer paper P from the main body of the device by discharging rollers not illustrated in the drawing to stack on a copy tray, which is not illustrated in the drawing, with the top surface up. Note that, the fixing device 270 is optionally equipped with a belt component.

The surface of the photoconductor drum 200 after the belt transfer is cleaned by a photoconductor drum cleaning device 201, and evenly diselectrified by the diselectrification lamp 202. Moreover, the residual toner on the circumferential surface of the intermediate transfer belt 501 after secondary transferring the toner images on the transfer paper P is cleaned by a belt cleaning blade 504. The belt cleaning blade 504 is designed to come to contact with the circumferential surface of the intermediate transfer belt 501 at the predetermined timing by means of a cleaning member moving unit, which is not illustrated in the drawing.

At the upstream of the belt cleaning blade 504 in the traveling direction of the intermediate transfer belt 501, a toner sealing member 502 coming in contact with and moving away from the circumferential surface of the intermediate transfer belt 501 is provided. The toner sealing member 502 receives the toner fell off from the belt cleaning blade 504 during the cleaning of the residual toner, to thereby prevent the fallen toner from scattering onto the transporting path of the transfer paper P. The toner sealing member 502 is brought into contact with or moved away from the circumferential surface of the intermediate transfer belt 501 by means of the cleaning member moving unit, together with the belt cleaning blade 504.

To the circumferential surface of the intermediate transfer belt 501 from which the residual toner has been removed in the aforementioned manner, a lubricant 506 is applied by a lubricant coating brush 505. The lubricant 506 is, for example, formed of a solid body such as of zinc stearate, and is provided so as to be in contact with the lubricant coating brush 505. Moreover, the residual charge remained on the circumferential surface of the intermediate transfer belt 501 is eliminated by diselectrification bias applied by a belt diselectrification brush, which is not illustrated, and is provided to be in contact with the circumferential surface of the intermediate transfer belt 501. Here, the lubricant coating brush 505 and the belt diselectrification brush are each designed to come to contact with and move away from the circumferential surface of the intermediate transfer belt 501, by means of a moving unit not illustrated in the drawing.

In the case of repeated photocopying, as for the operation of the color scanner and the image formation on the photoconductor drum 200, the image forming step of the first color (Bk) for the second sheet starts at the predetermined timing following to the image forming step of the fourth color (Y) for the first sheet. Moreover, following to the step for collectively transferring the superimposed four color toner images for the first sheet, the intermediate transfer belt 501 receives the Bk toner image for the second sheet, which is primary transferred, with the region of the circumferential surface thereof where cleaning has been performed with the belt cleaning blade 504. The same operation to that for the first sheet is performed thereafter. The explained above is a copy mode to give a four color full-color copy, but in case of a three color copy mode or two color copy mode, the same operations to the above are performed according to the designated colors and rotations. In the case of a monocolor copy mode, only the developing device of the predetermined color of the revolver developing unit 230 is driven in the developing operation state before copying of the predetermined number of sheets is completed, and the copying operation is performed with the belt cleaning blade 504 remaining in contact with the intermediate transfer belt 501.

Figure 3:
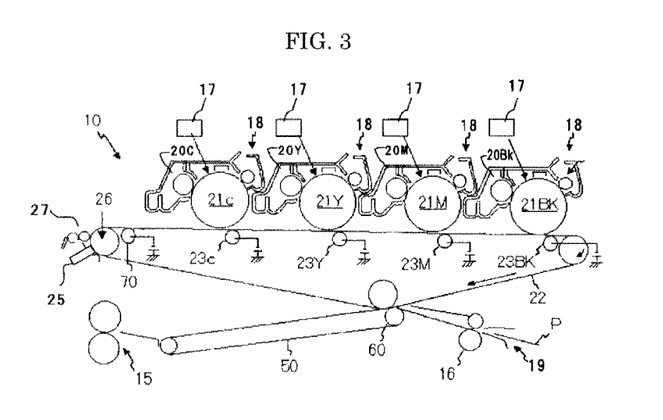
FIG. 3 is a schematic partial view illustrating one configuration Example of the image forming apparatus of the present invention in which a plurality of photoconductor drums are aligned along an intermediate transfer belt.

Although the photocopier equipped with only one photoconductor drum has been explained above, the present invention can be also applied for an image forming apparatus in which a plurality of photoconductor drums are aligned and provided along one intermediate transfer belt formed of a seamless belt, for example, as illustrated in FIG. 3.

FIG. 3 illustrates one configuration example of a four drum full color printer, in which four photoconductor drums 21Bk, 21Y, 21M, 21C for forming toner images of four different colors (black, yellow, magenta, cyan) are provided along the intermediate transfer belt.

In FIG. 3, the printer main body 10 is equipped with an image writing unit 17, an image forming unit 18, and a paper feeding unit 19, all of which are for performing color image formation by electrophotography. Image processing is performed by an image processing unit based on the image signal to convert into signals for each color black (Bk), magenta (M), yellow (Y), cyan (C) for image forming, and the resulting signals are sent to the image writing unit 17. The image writing unit 17 is a scanning optical system, for example, constituted of a laser light source, a deflector such as a rotating polygon mirror, a scanning imagery optical system, and a group of mirrors, and has four wiring optical paths each corresponding to a respective color signal. The image writing unit 17 writes on each of the photoconductor drums 21Bk, 21M, 21Y, 21C, which are image bearing members each provided for a respective color in the image forming unit 18, corresponding to each color signal.

The image forming unit 18 is equipped with the photoconductor drums 21Bk, 21M, 21Y, 21C, which are image bearing member for black (Bk), magenta (M), yellow (Y), and cyan (C), respectively. As for each photoconductor of each color, an OPC photoconductor is generally used. In the surrounding area of each of the photoconductor drums 21Bk, 21M, 21Y, 21C, a charging device, an exposure section with laser light from the image wiring unit 17, a developing device 20Bk, 20M, 20Y, or 20C of a respective color, black, magenta, yellow or cyan, a primary transfer bias roller 23Bk, 23M, 23Y or 23C as a primary transferring unit, a cleaning device (not illustrated), and a photoconductor dielectrification device (not illustrated) are provided. Note that, the developing devices 20Bk, 20M, 20Y, 20C apply a two-component magnetic blush developing system. The intermediate transfer belt 22, which is a belt component, is present between each of the photoconductor drums 21Bk, 21M, 21Y, 21C and each of the primary transfer bias rollers 23Bk, 23M, 23Y, 23C, and the toner image of each color formed on a respective photoconductor is successively superimposed and transferred.

Meanwhile, the transfer paper P is borne with the transfer conveying belt 50, which is a belt component, via a registration roller 16, after fed from a paper feeding unit 19. At the position where the intermediate transfer belt 22 is in contact with the transfer conveying belt 50, the toner images transferred onto the intermediate transfer belt 22 are secondary transferred (correlatively transferred) to the transfer paper P by a secondary transfer bias roller 60 serving as the secondary transferring unit. In the manner as mentioned above, a color image is formed on the transfer paper P. The transfer paper P on which the color image has been formed is transported to the fixing device 15 by the transfer conveying belt 50, and the transferred image is fixed by the fixing device 15, followed by discharging the transfer paper P from the printer main body.

Note that, the residual toner remained on the intermediate transfer belt 22 without being transferred at the time of the secondary transfer is removed from the intermediate transfer belt 22 by the belt cleaning member 25. At the downstream side of the belt cleaning member 25, a lubricant coating device 27 is provided. The lubricant coating device 27 contains a solid lubricant, and an electric conductive brush configured to apply the solid lubricant by rubbing the solid lubricant with the intermediate transfer belt 22. The electric conductive brush is always in contact with the intermediate transfer belt 22 to coat the intermediate transfer belt 22 with the solid lubricant. The solid lubricant has functions of enhancing cleaning ability of the intermediate transfer belt 22, and preventing occurrences of filming to improve the durability.

Seamless belts are used for a few members of the image forming apparatus, but one of the important members required for electric properties is an intermediate transfer belt, which is an intermediate transfer member. The intermediate transfer belt of the present invention will be explained hereinafter.

(Intermediate Transfer Belt)

The intermediate transfer belt of the present invention contains a base, an elastic layer formed on the base, and spherical particles deposited on a surface of the elastic layer, and may further contain other components, if necessary.

The intermediate transfer belt is suitably mounted in an image forming apparatus adapting an intermediate transfer belt system. For Example, it is a system where a plurality of color toner developed images successively formed on a photoconductor drum serving as an image bearing member are successively superimposed on an intermediate transfer belt to perform primary transfer, and the primary transferred images are collectively transferred on a recording medium to perform secondary transfer.

Figure 1:
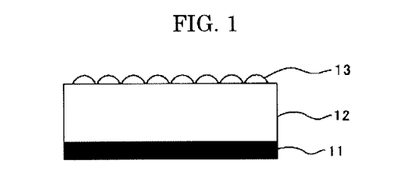
FIG. 1 is a schematic diagram illustrating one Example of the layer structure of the intermediate transfer belt of the present invention.

FIG. 1 illustrate a layer structure of the intermediate transfer belt suitably used in the present invention. As for the structure of the intermediate transfer belt, a flexible elastic layer 12 is laminated on a base layer 11 which is relatively flexible and is rigid, and on the outer surface, spherical particles 13 are each independently aligned (embedded) along the plane direction of the elastic layer 12 to thereby form uniform texture pattern (convexo-concave shape). In the monolayer state of the spherical particles 13, the particles are not on top of each other in the layer thickness direction, or the entire spherical particles 13 are not completely embedded into the elastic layer 12.

<Base Layer>

First, a base layer, which is a base of the intermediate transfer belt, will be explained. Materials for forming the base layer include a resin including therein fillers (or additives) for controlling electric resistance, so called an electric resistance regulator.

As for the resin, for Example, a fluororesin (e.g., PVDF, and ETFE), a polyimide resin, and a polyamide imide resin are preferable in view of flame resistance, and the polyimide resin and polyamide imide resin are particularly preferable in view of their physical strength (high elasticity) and thermal resistance.

The electric resistance regulator is appropriately selected depending on the intended purpose without any restriction, and Examples thereof include metal oxide, carbon black, an ion conducting agent, and an electric conductive high polymer material. Examples of the metal oxide include zinc oxide, tin oxide, titanium oxide, zirconium oxide, aluminum oxide, and silicon oxide. Also, the Examples further include the aforementioned metal oxides, which have been subjected to a surface treatment in advance so as to improve dispersibility thereof. Examples of the carbon black include ketjen black, furnace black, acetylene black, thermal black, and gas black. Examples of the ion conducting agent include tetraalkyl ammonium salts, trialkylbenzyl ammonium salts, alkyl sulfonate, alkyl benzene sulfonate, alkyl alkyl sulfate, glycerin fatty acid ester, sorbitan fatty acid ester, polyoxyethylene alkyl amine, polyoxyethylene fatty alcohol ester, alkyl betaine, and lithium perchlorate. These may be used independently, or in combination.

Note that, the electric resistance regulator usable in the present invention is not limited to the compounds listed above. Moreover, a coating liquid containing at least a resin component, which is used for producing the intermediate transfer belt of the present invention, may further contain additives such as a dispersing agent, a reinforcing agent, a lubricant, a heat conducting material, and an antioxidant.

In the case where the electric resistance regulator is used in a seamless belt, which is preferably mounted as the intermediate transfer belt of the present invention, it is preferred that the electric resistance regulator be added to give the seamless belt the following ohmic values, the surface resistivity of $1 \times 10^8 \Omega/\square$ to $1 \times 10^{13} \Omega/\square$, and the volume resistivity of $1 \times 10^8 \Omega \cdot cm$ to $1 \times 10^{11} \Omega \cdot cm$, provided that the amount thereof is adjusted so that the resulting belt will not become brittle or easily crackable in terms of the mechanical strength, and the aforementioned ohmic values are achieved. Namely, in the formation of the intermediate transfer belt, a coating liquid in which the formulations of the resin component (e.g., a polyimide resin precursor, and polyamide imide resin precursor) and the electric resistance regulator are appropriately adjusted is preferably used to produce a seamless belt having a desirable balance between the electric properties (surface resistivity and volume resistivity) and the mechanical strength.

The average thickness of the base layer is appropriately selected depending on the intended purpose without any restriction, but the average thickness thereof is preferably 30 µm to 150 µm, more preferably 40 µm to 120 µm, and even more preferably 50 µm to 80 µm. When the average thickness thereof is less than 30 µm, cracks or cleaves may be formed therein, and as a result, the belt may be easily torn. When the average thickness thereof is greater than 150 µm, the resulting belt may be cracked by bending. When the average thickness thereof is in the range of 50 µm to 80 µm, in contrast, it is advantageous in view of the durability of the belt.

A method for measuring the average thickness of the base layer is appropriately selected depending on the intended purpose without any restriction, and Examples thereof include a measurement method using a contact type or eddy current type thickness tester, and a method for measuring a cross-section of the layer by a scanning electron microscope (SEM).

An amount of the electric resistance regulator is appropriately selected depending on the electric resistance regulator for use without any restriction. In the case of the carbon black, for Example, the amount thereof is preferably 10% by mass to 25% by mass, more preferably 15% by mass to 20% by mass in the total solids of the coating liquid. In the case of the metal oxide, moreover, the amount thereof is preferably 1% by mass to 50% by mass, more preferably 10% by mass to 30% by mass in the total solids of the coating liquid. When the amount thereof is smaller than the aforementioned respective range, uniformity in the ohmic value may not be attained, which may results in a large change in the ohmic value with respect to the predetermined voltage. When the amount thereof is greater than the respective range, the mechanical strength of the intermediate transfer belt lowers, which is not preferable on the practical use.

As for the polyimide, and the polyamide imide, they may be appropriately synthesized by any of the conventional methods, or may be selected from commercial products. Examples of the commercial products include general-purpose products commonly available from manufacturers such as Du Pont-Toray Co., Ltd., Ube Industries, Ltd., New Japan Chemical Co., Ltd., JSR, UNITIKA LTD., I.S.T., Hitachi Chemical Company, Ltd., TOYOBO CO., LTD., and Arakawa Chemical Industries, Ltd.

<Elastic Layer>

Next, an elastic layer laminated on the base layer will be explained. A material for forming the elastic layer is appropriately selected depending on the intended purpose without any restriction, and Examples thereof include rubber, such as natural rubber and synthetic rubber. In view of antiozone properties, flexibility, adherence to the spherical particles, providing flame resistance, and stability to environment, the acrylic rubber is particularly preferable.

As for the acrylic rubber, a crosslink structure (crosslinked product) is preferably formed by reacting with the crosslinking agent that will be described later. Examples of such acrylic rubber include an epoxy group-crosslinking acrylic rubber, an active chlorine group-crosslinking acrylic rubber, and a carboxyl group-crosslinking acrylic rubber depending on a functional group that becomes a crosslinking point of the crosslink structure. Among them, the carboxyl group-crosslinking acrylic rubber is preferable as it has excellent rubber physical properties (especially permanent compression set) and processability.

A crosslinking agent used for the carboxyl group-crosslinking acrylic rubber is appropriately selected depending on the intended purpose without any restriction, and for Example, an amine compound is preferable, and a polyamine compound is more preferable. Specific Examples of the polyamine compound include an aliphatic polyamine crosslinking agent, and an aromatic polyamine crosslinking agent.

Examples of the aliphatic polyamine crosslinking agent include hexamethylene diamine, hexamethylene diamine carbamate, and N,N'-dicinnamylidene-1,6-hexane diamine.

Examples of the aromatic polyamine crosslinking agent include 4,4'-methylene dianiline, m-phenylene diamine, 4,4'-diaminodiphenyl ether, 3,4'-diaminodiphenyl ether, 4,4'-(m-phenylenediisopropylidene)dianiline, 4,4'-(p-phenylenediisopropylidene)dianiline, 2,2'-bis[4-(4-aminophenoxy)phenyl]propane, 4,4'-diaminobenzanilide, 4,4'-bis(4- aminophenoxy)bisphenyl, m-xylylene diamine, p-xylylene diamine, 1,3,5-benzene triamine, and 1,3,5-benzene triaminomethyl.

An amount of the crosslinking agent is preferably 0.05 parts by mass to 20 parts by mass, more preferably 0.1 parts by mass to 5 parts by mass, relative to 100 parts by mass of the acrylic rubber. When the amount of the crosslinking agent is smaller than 0.05 parts by mass, a crosslink reaction is not sufficiently progressed, and thus it is difficult to maintain the shape of the crosslink product. When the amount thereof is greater than 20 parts by mass, the resulting crosslink product becomes excessively hard, which impairs the elasticity as of a crosslink rubber.

The elastic layer formed of the acrylic rubber may further contain a crosslink accelerator in combination with the aforementioned crosslinking agent. The crosslink accelerator is appropriately selected depending on the intended purpose without any restriction, but it is preferably a crosslink accelerator that can be used together with the polyvalent amine crosslinking agent. Examples of the crosslink accelerator include a guanidine compound, an imidazole compound, quaternary onium salts, a polyvalent tertiary amine compound, a tertiary phosphine compound, and weak acid alkali metal salts. Examples of the guanidine compound include 1,3-diphenylguanidine, and 1,3-diorthotolyl guanidine. Examples of the imidazole compound include 2-methylimidazole, and 2-phenylimidazole. Examples of the quaternary onium salt include tetra-n-butylammonium bromide, and octadecyltri-n-butylammonium bromide.

Examples of the polyvalent tertiary amine compound include triethylene diamine, and 1,8-diazabicyclo[5.4.0]undec-7-ene (DBU).

Examples of the tertiary phosphine compound include triphenylphosphine, and tri-p-trisphosphine.

Examples of the weak acid alkali metal salts include inorganic weak acid salts (e.g. phosphate, and carbonate) of sodium or potassium; and organic weak acid (e.g. stearate, and laurate) of sodium or potassium.

An amount of the crosslink accelerator is appropriately selected depending on the intended purpose without any restriction, but it is preferably 0.1 parts by mass to 20 parts by mass, more preferably 0.3 parts by mass to 10 parts by mass, relative to 100 parts by mass of the acrylic rubber. When the amount thereof is greater than 20 parts by mass, the crosslinking speed may be too fast during the crosslinking reaction, or blooms of the crosslink accelerator may be formed on the surface of the crosslink product, or the resulting crosslink product may become excessively hard. When the amount thereof is smaller than 0.1 parts by mass, the tensile strength of the resulting crosslink product may be significantly reduced, or there may be a significant change in elongation or in tensile strength after heat is applied.

For the preparation of the acrylic rubber, any of mixing methods, such as roller mixing, banbury mixing, screw mixing, and solution mixing is appropriately selected. The order of mixing the materials is appropriately selected depending on the intended purpose without any restriction, but it is preferred that after sufficiently mixing components which are hardly reactive or decomposed by heat, components which react or are decomposed by heat, such as a crosslinking agent, be mixed for a short period at the temperature at which a reaction or decomposition does not occur.

The acrylic rubber can become a crosslinked product as a result of heating. The heating temperature is preferably 130° C. to 220° C., more preferably 140° C. to 200° C. The duration for crosslinking is preferably 30 seconds to 5 hours.

The heating method is appropriately selected depending on the intended purpose without any restriction, and for example, the heating method is appropriately selected from methods used for crosslinking rubbers, such as press heating, steam heating, oven heating, and hot air heating. After crosslinking once, moreover, post crosslinking may be performed to surely crosslink the inner part of the crosslink product.

The heating duration for the post crosslinking varies depending on a heating method, crosslinking temperature, and shape of a product to be crosslinked, but it is preferably 1 hour to 48 hours. The heating method and heating temperature for the post crosslinking are appropriately selected.

As for the flexibility of the elastic layer, the elastic layer has micro rubber hardness of 40° or lower in the environment of 10° C. and 15% RH. The measurement of flexibility by so-called microhardness, such as Martens hardness, and Vickers hardness, can only measure the hardness of a shallow area of the measuring site in the bulk direction, i.e., only the area very adjacent to a surface. Therefore, the deformability of the entire intermediate transfer belt cannot be evaluated by such measurement. For example, when the intermediate transfer belt has a structure having low deformability as a whole but having a flexible material at an outermost surface, the microhardness of the intermediate transfer belt is low. Such belt has low deformability, i.e. poor correspondence to paper having irregularities on its surface. As a result, the belt has insufficient transfer ability to paper having irregularities on its surface, which has been currently desired. For this reason, it is preferred that the intermediate transfer belt be measured by micro rubber hardness which can evaluate the deformability of the entire intermediate transfer belt.

For the measurement of the micro rubber hardness, a commercially available micro rubber hardness tester can be used, for Example, a micro rubber hardness tester MD-1 of KOBUNSHI KEIKI CO., LTD. can be used.

The average thickness of the elastic layer is appropriately selected depending on the intended purpose without any restriction, provided that it does not adversely affect the obtainable effect of the present invention, but it is preferably 300 μm to 1,000 μm. When the average thickness is less than 300 μm, the resulting image formed on paper having irregularities on its surface may have insufficient image quality. When the average thickness thereof is more than 1,000 μm, shrinkage of the rubber is significant, which may cause large warps at the edges of the belt, or may cause a bend of the belt due to its weight, resulting in unstable running of the belt, or may cause cracking due to the curvature of the belt at the curving part of the roller around which the intermediate transfer belt is supported. Accordingly, such average thickness of the elastic layer is not preferable. Note that, the average thickness can be measured for example by measuring a cross section of the elastic layer by a scanning electron microscope (SEM).

The elastic layer may contain a compound for applying flame resistance, and as such the compound red phosphorous and a metal hydroxide compound are preferably used because it gives fewer environmental loads in order to give flame resistance, is inexpensive, and hardly loses flexibility (shaping performance). Examples of the metal hydroxide compound include aluminum hydroxide, and magnesium hydroxide. Among them, aluminum hydroxide is preferable because it hardly changes its hardness and resistance in the fluctuations of the environment, such as in the environment of low temperature low humidity, or high temperature and high humidity. To attain the flame resistance only with the metal hydroxide compound, the metal hydroxide compound is generally added in an amount of 100 parts by mass or greater relative to the rubber, which impairs the flexibility of the resulting product. By using the red phosphorous in combination, high flame resistance and high flexibility are both realized with suppressing the formulated amount of the metal hydroxide compound.

It is preferred that the elastic layer exhibit V-0 in the UL94-V flammability test, or VTM-0 in the UL94-VTM flammability test.

Specifically, it is preferred that the metal hydroxide compound be added in an amount of 10 parts by mass to 40 parts by mass relative to 100 parts by mass of the rubber, and the red phosphorous be added in an amount of 10 parts by mass to 25 parts by mass relative to 100 parts by mass of the rubber. When the amounts of the metal hydroxide compound and the red phosphorous are lower than the lowest limits of the aforementioned respective range, the flame resistance cannot be attained. When the amounts thereof are greater than the upper limits of the respective range, the micro rubber hardness may become larger than 40°. As mentioned earlier, a change in flexibility of the rubber corresponding to a change in the environment such as low temperature and low humidity, and high temperature and high humidity cannot be measured with microhardness, and therefore an evaluation by a measurement of micro rubber hardness is desirable.

The elastic layer is formed by combining the aforementioned selected materials with an electric resistance regulator, and optionally an antioxidant, a reinforcer, fillers, and a vulcanization accelerator.

The intermediate transfer belt is adjusted to have the required resistivity. In the case where acrylic rubber is used in the elastic layer, the acrylic rubber itself has high resistivity, and thus an electric conductive agent is added as the electric resistance regulator to the acrylic rubber. Examples of the electric conductive agent include carbon, and an ion conducting agent. Among them, use of the ion conducting agent is preferable because it can exhibits an effect with a small amount, and it does not adversely affect the rubber hardness as the rubber hardness is the important factor in the present invention.

Specifically, it is preferred that 0.01 parts by mass to 3 parts by mass of various perchlorates or ionic liquid be added to 100 parts by mass of the acrylic rubber. When the amount of the ion conducting agent added is smaller than 0.01 parts by mass, the effect of reducing the resistivity cannot be attained. When the amount thereof is greater than 3 parts by mass, there may be a high possibility to cause blooming or bleeding of the electric conductive agent to the belt surface. As for the resistivity of the elastic layer, the elastic layer preferably has surface resistivity of $1\times10^8 \Omega/\square$ to $1\times10^{13} \Omega/\square$, and volume resistivity of $1\times10^7 \Omega \cdot cm$ to $1\times10^{12} \Omega \cdot cm$.

<Spherical Particles>

The spherical particles deposited on the elastic layer will be explained next.

Here, "spherical particles" are particles having the average particle diameter of 100 μm or smaller, having spherical shapes, being insoluble to an organic solvent, and having 3% thermal decomposition temperature of 200° C. or higher.

Figure 6A:
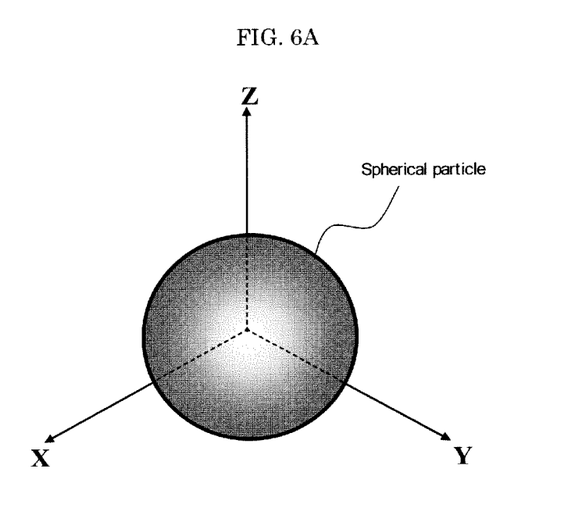
FIG. 6A is a schematic diagram illustrating one Example of the shape of the spherical particle for use in the present invention.
Figure 6B:
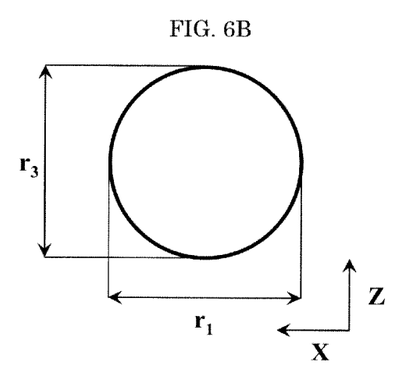
FIG. 6B is a schematic diagram for explaining the shape of the spherical particle for use in the present invention.
Figure 6C:
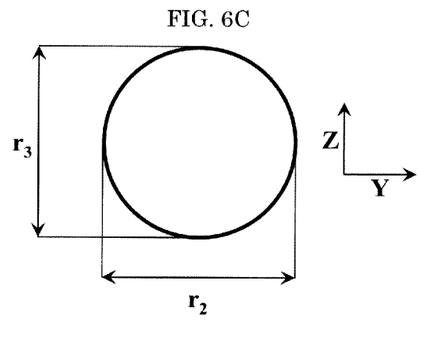
FIG. 6C is another schematic diagram for explaining the shape of the spherical particle for use in the present invention.

The shapes (spherical shapes) of the particles for use in the present invention can be represented by the following shape regulation. FIGS. 6A to 6C are schematic diagrams each illustrating the shape of the spherical particle for use in the present invention. Having that a long axis, a short axis and thickness of the spherical particle are determined as r1, r2, and r3 (provided that r1≥r2≥r3) respectively in FIGS. 6A to 6C, the particle having a ratio (r2/r1) (see FIG. 6B) of 0.9 to 1.0, and a ratio (r3/r2) (see FIG. 6C) of 0.9 to 1.0 is determined as a spherical particle in the present invention. When the ratio (r2/r1) and the ratio (r3/r2) are less than 0.9, the shape of the particle is apart from a spherical shape, and thus a space between the particles becomes large, causing failures to desirably transfer the toner, or cleaning failures, cannot attain high image quality.

Note that, the aforementioned r1, r2, and r3 can be measured for example by the following method. Specifically, the spherical particles are uniformly spread and deposited on a smooth measurement surface, 100 spherical particles are observed under a color laser microscope VK-8500 (manufactured by Keyence Corporation) with the magnification of 1,000 times to measure the long axis r1 (μm), the short axis r2 (μm) and the thickness r3 (μm) of the 100 spherical particles, and the arithmetic mean values are calculated from the obtained values, and are determined as r1, r2, and r3, respectively.

The material of the spherical particles is appropriately selected depending on the intended purpose without any restriction, and Examples thereof include resins such as acrylic resins, melamine resins, polyamide resins, polyester resins, silicone resins, and fluororesin. Moreover, the spherical particles may be spherical particles each formed of the resin material, surfaces of which are treated with a different material.

Moreover, the spherical particles include spherical particles formed of a rubber material. The spherical particles each having a particle structure where a spherical particle formed of a rubber material is coated with a head resin can be also used. Further, the spherical particles may be hollow particles, or porous particles.

Among the aforementioned resins, the silicone resin is particularly preferable because it has releasing properties to the toner, and has high ability to give abrasion resistance. The spherical particles are preferably particles formed by a polymerization method using the resin to give spherical shapes, more preferably particles having the shapes closer to sphere. As for the particle diameters of the spherical particles, the spherical particles preferably have the volume average particle diameter of 0.5 μm to 5.0 μm, and moreover, they are preferably monodisperse particles.

The "monodisperse particles" do not mean particles having the uniform particle diameter, but mean particles having an extremely sharp particle size distribution. Specifically, the particle size distribution has a distribution width of ±(the average particle diameter×0.5) μm or smaller. When the volume average particle diameter thereof is smaller than 0.5 μm, the effect of transfer performance owing to the spherical particles may not be sufficiently obtained. When the volume average particle diameter is larger than 5.0 μm, the surface roughness of the resulting belt becomes large, and the pitches between particles become large, which may inhibit desirable transfer of the toner, or cause cleaning failures.

Moreover, most materials for forming the spherical particles have high insulating properties. When the particle diameters of the spherical particles are large, therefore, the residual charge potential due to the spherical particles is accumulated during the continuous image outputs, which may cause problems such as occurrences of image disturbance. Note that, the timing of applying the spherical particles to the surface of the elastic layer is not particularly restricted and it can be either before or after vulcanization of the rubber.

The spherical particles are appropriately synthesized or selected from commercial products without any restriction. Examples of the commercial products thereof include silicone particles (product names: TOSPEARL 120, TOSPEARL 145, and TOSPEARL 2000B, manufactured by Momentive Performance Materials Inc.), and acryl particles (product name: Techpolymer MBX-SS, manufactured by SEKISUI PLASTICS CO., LTD.).

<Surface Profile of Intermediate Transfer Belt>

The surface profile of the intermediate transfer belt of the present invention will be explained next.

Figure 4:
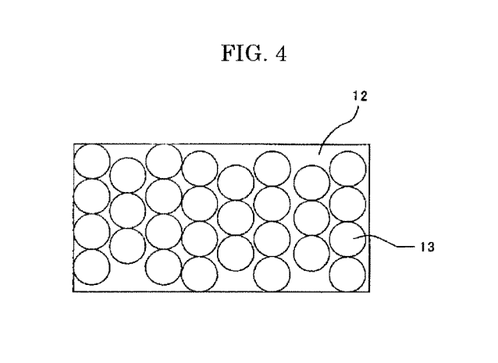
FIG. 4 is an enlarged schematic diagram viewing the surface of the intermediate transfer belt of the present invention from the top.

FIG. 4 is an enlarged schematic diagram observing a surface of the intermediate transfer belt from the top. As illustrated in FIG. 4, the intermediate transfer belt has an embodiment where spherical particles having a sharp particle size distribution are each independently regularly aligned. The overlapping of the spherical particles is hardly observed. It is preferred that diameters of cross sections in the layer laminating direction of the spherical particles constituting a surface be uniform. Specifically, the spherical particles preferably have a particle size distribution width of ±(the average particle diameter×0.5) μm.

To achieve the aforementioned surface profile, use of the spherical particles having the particle sizes as similar as possible is preferable. Alternatively, the surface profile having the aforementioned particle size distribution width may be achieved by a method in which spherical particles of certain particle diameters are selectively deposited on a surface, without using the spherical particles having the same particle size.

The area occupancy rate of the spherical particles in the surface of the elastic layer is appropriately selected depending on the intended purpose without any restriction, but it is preferably 60% or higher. When the area occupancy rate thereof is lower than 60%, the exposed part of the surface of the elastic layer is excessively large so that the toner is brought into contact with the elastic layer, which leads to failures to achieve excellent transfer ability.

In the embodiment of the present invention, the spherical particles are partially embedded in the elastic layer. The embedding rate of the spherical particles is preferably higher than 50%, but lower than 100%, more preferably 51% to 90%. When the embedding rate is 50% or lower, the spherical particles tend to detached after using for a long period in an image forming apparatus, giving the resulting intermediate transfer belt poor durability. When the embedding rate is 100%, the effect of the spherical particles to the transfer ability reduces, which is not preferable.

Note that, the embedding rate is a rate of the diameter of the spherical particle embedded in the elastic layer in the depth direction, but in the present specification, the aforementioned embedding rate does not mean that all of the spherical particles have the embedding rate of higher than 50% but lower than 100%, as long as the spherical particles in a certain area fall into the range of higher than 50% but lower than 100% as calculated as the average embedding rate. When the embedding rate is 50%, hardly any spherical particles completely embedded in the elastic layer are observed in the cross-section examination by an electron microscope (the number of the spherical particles embedded completely in the elastic layer is 5% or lower relative to the total numbers of the spherical particles).

One example of the methods for producing the intermediate transfer belt having the aforementioned structure will be explained.

First, the production method of a base layer will be explained.

The method for producing a base layer using a coating liquid containing at least a resin component, i.e., a coating liquid containing the polyimide resin precursor or polyamide imide resin precursor, will be explained.

While slowly rotating a cylindrical mold, e.g., a cylindrical metal mold, a coating liquid containing at least a resin component (e.g., a coating liquid containing a polyimide resin precursor or polyamide imide resin precursor) is uniformly applied to the entire outer surface of the cylinder by coating or flow casting (forming a coating film) by means of a liquid supplying device such as a nozzle or dispenser.

Thereafter, the rotation speed is increased to a certain speed, and the rotation speed is maintained for a certain period after reaching the certain speed. Then, the temperature is gradually decreased while rotating, to evaporate the solvent contained in the coating film at the temperature of about 80° C. to about 150° C. During this process, the steam (i.e., evaporated solvent, etc.) in the atmosphere is preferably removed by efficiently circulating the air.

When the film having a self-supporting ability is formed, the film with the metal mold is moved into a heating furnace (a baking furnace) capable of carrying out a high temperature treatment, the temperature is increased stepwise, and then the film is finally subjected to a high temperature treatment (baking) at 250° C. to 450° C., to thereby sufficiently transform the polyimide resin precursor or polyamide imide resin precursor into polyimide or polyamide imide, respectively. After sufficiently cooling, an elastic layer is laminated on the base layer.

For the formation of the elastic layer, a rubber coating material in which rubber is dissolved in an organic solvent is used. The rubber coating material is applied onto the base layer by coating, followed by drying the solvent, subjecting to vulcanization, to thereby produce an elastic layer. As for the coating method, conventional coating methods such as spiral coating, die coating, and roller coating can be applied similarly as in the production of the base layer. However, a thickness of the elastic layer needs to be thick for improving the transfer ability on irregular surfaces. As for the coating method for forming a thick film, die coating and spiral coating are preferable. The spiral coating is explained here. The rubber coating material is spirally applied onto the base layer by continuously applying the rubber material from a round shape or broad-line nozzle and moving the nozzle along the axial direction of the base, with rotating the base layer in the circumferential direction. The coating material spirally coated on the base layer is dried while being leveled by maintaining a certain rotational speed and drying temperature. Thereafter, the resultant is subjected to vulcanization (crosslinking) at the predetermined vulcanization temperature to thereby form an elastic layer.

<Deposition Method of Spherical Particles>

The vulcanized elastic layer is then sufficiently cooled, followed by depositing spherical particles on the elastic layer, to thereby obtain an intermediate transfer belt, which is the predetermined seamless belt.

Figure 5:
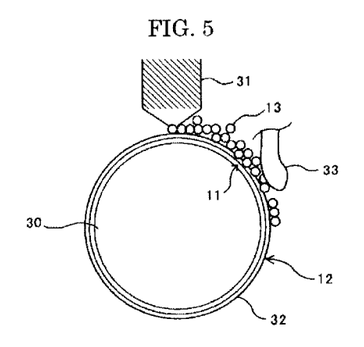
FIG. 5 is a schematic diagram illustrating one Example of a powder supplying device for use in the production of the intermediate transfer belt of the present invention.

The deposition method of the spherical particles includes, as illustrated in FIG. 5, setting a powder supplying device 31 and a press member 33 facing a surface of a belt 32, in which the elastic layer 12 is laminated on the base layer 11, supported around the peripheral surface of the metal mold 30, which is a cylindrical support, in another words, facing the surface of the elastic layer 12; uniformly spreading the spherical particles 13 on the surface of the elastic layer 12 from the powder supplying device 31 while rotating; pressing the spherical particles 13 spread on the surface of the elastic layer 12 with the press member 33 at a constant pressure; and embedding the spherical particles 13 into the elastic layer 12 by the press member 33, at the same time, removing the excess spherical particles 13. In the present invention, use of the monodispersible spherical particles 13 enables the formation of the uniform monoparticle alignment at the surface of the elastic layer 12 by a simple step, i.e., only by leveling with press member 33. The embedding rate of the spherical particles 13 in the elastic layer 12 can be adjusted by adjusting the duration for pressing with the press member 33.

Note that, the adjustment of the embedding rate of the spherical particles in the elastic layer can be performed by another method. For example, it can be easily achieved by adjusting the pressing force of the press member. For example, the aforementioned embedding rate of higher than 50% but lower than 100% can be relatively easily achieved by setting, as a rough standard, the pressing force to 1 mN/cm to 1,000 mN/cm with the viscosity of the flow casting coating liquid being 100 mPa·s to 100,000 mPa·s, though it varies depending on the viscosity of the flow casting coating liquid, solid content, amount of the solvent, and material of particles.

After uniformly aligning the spherical particles on the surface of the elastic layer, the elastic layer is cured by heating at the predetermined temperature for the predetermined duration while rotating, to thereby form the elastic layer in which the spherical particles are embedded. After sufficiently cooling, the resultant is released by detaching the base layer from the metal mold, to thereby obtain an intermediate transfer belt, which is the predetermined seamless belt.

<Measurement Method of Embedding Rate of Spherical Particles in Intermediate Transfer Belt>

A method for measuring the embedding rate of the spherical particles in the intermediate transfer belt is appropriately selected depending on the intended purpose without any restriction, and for example, it can be measured by observing the cross-section of the intermediate transfer belt cut in the thickness direction under a scanning electron microscope (SEM).

The resistivity of the intermediate transfer belt prepared in the aforementioned manner can be adjusted by changing the amounts of carbon black, ion conducting agent, etc. For the adjustment of the resistivity, it should be noted that the resistivity is easily changed depending on the sizes of the spherical particles or the area occupancy rate. For the measurement of the resistivity, commercially available measuring devices can be used. For example, it can be measured by means of Hiresta of Mitsubishi Chemical Analytech Co., Ltd.

EXAMPLES

The present invention will be more specifically explained through Examples, but these Examples shall not be construed as limiting the scope of the present invention, and any modification appropriately made to these Examples are within the scope of the present invention provided that it is not apart from the spirit of the present invention. Note that, evaluations of physical properties of each of Examples and Comparative Examples are carried out under the following conditions.

Micro rubber hardness: MD-1 (KOBUNSHI KEIKI CO., LTD.)

Flame resistance: As a sample piece, a laminate in which an elastic layer on which spherical particles had been deposited was laminated on a polyimide base layer was used, and measured in accordance with ASTM D3801 (or ASTM D4804).

Microhardness: FisherScope HM2000 of Fischer Instruments K.K. was used, and Martens hardness was measured with the indentation depth of 10 μm.

Surface resistivity: Hiresta of Mitsubishi Chemical Analytech Co., Ltd. was used, and the value when the voltage of 500V was applied for 10 seconds was taken as the resistivity.

Ranks of image quality on irregular surface texture paper: The produced intermediate transfer belt was mounted in the image forming apparatus of FIG. 2 (imagio MP C7501, manufactured by Ricoh Company Limited), and image quality (transfer properties of two color, cyan, magenta, blue solid image) on paper having irregularities on a surface thereof (Lezac 260 [kg] paper) was visually observed and evaluated based on ranks.

Measuring environment: Other than the measurement test of the flame resistance, the evaluations were carried out in two environments including the LL environment having the temperature of 10° C. and the humidity of 15% RH, and the MM environment having the temperature of 23° C., and the humidity of 50% RH.

Example 1, Example 2, Example 3, and Example 4

A base layer coating liquid was prepared in the following manner, and a base layer of a seamless belt was prepared using the base layer coating liquid.

<Preparation of Base Layer Coating Liquid>

First, a carbon black dispersion liquid in which carbon black (SpecialBlack 4, of Evonik Degussam Japan Co., Ltd.) had been previously dispersed in N-methyl-2-pyrrolidone by a bead mill was blended into a polyimide varnish (U-Varnish A, of Ube Industries, Ltd.) containing a polyimide resin precursor as a main component so that the carbon black content became 16.7% by mass relative to the polyamic acid solids, and the resultant was sufficiently stirred and mixed to thereby prepare a base layer coating liquid.

<Preparation of Polyimide Base Layer Belt>

A cylindrical metal support having an outer diameter of 340 mm and a length of 360 mm, an outer surface of which had been roughened by a blast treatment, was used as a mold, and was mounted in to a roll-coat coating device. Subsequently, Base layer coating liquid A was poured into a pan, and the coating liquid was feed at the rotational speed of the coating roller of 40 mm/sec, and the thickness of the coating liquid on the coating roller was controlled by setting the gap between the regulation roller and the coating roller to 0.6 mm.

Thereafter, the rotational speed of the cylindrical support was controlled to 35 mm/sec, and the cylindrical support was moved close to the coating roller. The coating liquid on the coating roller was uniformly transferred and coated on the cylindrical support with setting the gap between the coating roller and the cylindrical support to 0.4 mm, and then the cylindrical support was placed a hot air circulating dryer in with maintaining its rotation to gradually heat to 110° C., heated at 110° C. for 30 minutes, and then heated at 200° C. for 30 minutes, then the rotation thereof was stopped. Thereafter, the resultant was introduced into a heating furnace (baking furnace) capable of performing a high temperature treatment, and was heated to 320° C. stepwise, and subjected to a heat treatment (baking) for 60 minutes. After cooling sufficiently, Polyimide base layer belt A was obtained.

<Production of Elastic Layer on Polyimide Base Layer Belt>

Each rubber composition was prepared by blending components presented in Table 1 with the proportion presented in Table 1, and kneading the resulting mixture.

TABLE 1

|  | Ex. 1 | Ex. 2 | Ex. 3 | Ex. 4 |
| --- | --- | --- | --- | --- |
| Acrylic rubber | 100 | 100 | 100 | 100 |
| Stearic acid | 0.5 | 0.5 | 0.5 | 1 |
| Red phosphorous | 10 | 10 | 20 | 10 |

TABLE 1-continued

|  | Ex. 1 | Ex. 2 | Ex. 3 | Ex. 4 |
|---|---|---|---|---|
| Aluminum hydroxide | 20 | 40 | 20 | — |
| Magnesium hydroxide | — | — | — | 40 |
| Crosslinking agent | 0.6 | 0.6 | 0.6 | 0.6 |
| Crosslink accelerator | 1 | 1 | 1 | 1 |
| Electric conductive agent | 0.3 | 0.3 | 0.3 | 0.3 |

Acrylic rubber: Nipol AR12, manufactured by ZEON CORPORATION
Stearic acid: BEAD STEARIC ACID CAMELLIA, manufactured by NOF CORPORATION
Red phosphorous: Novaexcell 140F, manufactured by RINKAGAKU KYOGYO CO., LTD.
Aluminum hydroxide: HIGILITE H42M, manufactured by Showa Denko K. K.
Magnesium hydroxide: KISUMA 5A, manufactured by Kyowa Chemical Industry Co., Ltd.
Crosslinking agent: DIAK No. 1 (hexamethylene diaminecarbamate), of DuPont Dow Elastomers
Crosslink accelerator: VULCOFAC ACT55 (70% a salt of 1,8-diazabicylclo (5,4,0)undec-7-en and dibasic acid, 30% amorphous silica), of Safic-Alcan
Electric conductive agent: QAP-01(tetrabutyl ammonium perchlorate), manufactured by Japan Carlit Co., Ltd.

Next, the obtained rubber composition was dissolved in an organic solvent (methyl isobutyl ketone: MIBK) to thereby prepare a rubber solution having a solid content of 35% by mass. The prepared rubber solution was spirally applied on the previously prepared polyimide base layer by rotating the cylindrical support on which the polyimide base layer had been formed, and continuously ejecting the rubber solution from a nozzle while moving the nozzle along the axial direction of the support. As for the coating amount, the amount of the rubber solution was adjusted so that the average thickness of the final elastic layer was to be 500 μm. Thereafter, the cylindrical support on which the rubber solution had been applied was placed in a hot air circulating dryer, and heated to 90° C. at the heating rate of 4° C./min and then heated for 30 minutes.

Thereafter, the cylindrical support was taken out from the dryer and cooled. Silicone spherical particles (TOSPEARL 120 (volume average particle diameter of 2.0 μm); $r2/r1=0.97$, $r3/r2=0.96$; Momentive Performance Materials Inc.) were evenly spread as spherical particles on the surface of the resulting layer on the cylindrical support by the method of FIG. 5, and a press member of a polyurethane blade was pressed against the spherical particles at the press force of 100 mN/cm to fix the spherical particles in the elastic layer. Subsequently, the resultant was again placed into a hot air circulating dryer, heated to 170° C. at the heating rate of 4° C./min, and subjected to a heat treatment for 60 minutes, to thereby obtain Intermediate Transfer Belt A (Example 1), Intermediate Transfer Belt B (Example 2), Intermediate Transfer Belt C (Example 3), and Intermediate Transfer Belt D (Example 4), respectively.

Example 5

Intermediate Transfer Belt E was prepared in the same manner as in Example 1, provided that the spherical particles were changed from the silicone spherical particles (the product name: TOSPEARL 120 of Momentive Performance Materials Inc., volume average particle diameter: 2.0 μm) to silicone spherical particles (the product name: TOSPEARL 145 of Momentive Performance Materials Inc., volume average particle diameter: 4.7 μm, $r2/r1=0.94$, $r3/r2=0.96$).

Example 6

Intermediate Transfer Belt F was prepared in the same manner as in Example 1, provided that the spherical particles were changed from the silicone spherical particles (the product name: TOSPEARL 120 of Momentive Performance Materials Inc., volume average particle diameter: 2.0 μm) to silicone spherical particles (the product name: TOSPEARL 2000B of Momentive Performance Materials Inc., volume average particle diameter: 6.0 μm, $r2/r1=0.96$, $r3/r2=0.93$).

Example 7

Intermediate Transfer Belt G was prepared in the same manner as in Example 1, provided that the spherical particles were changed from the silicone spherical particles to acryl spherical particles (the product name: Techpolymer MBX-SS, of SEKISUI PLASTICS CO., LTD. volume average particle diameter: 1 μm, $r2/r1=0.91$, $r3/r2=0.94$).

Comparative Example 1, Comparative Example 2

Rubber compositions of Comparative Examples 1 and 2 were prepared in the same manner as in Example 1 to 4 by kneading all the materials, provided that the proportion of each component presented in Table 1 was changed to the proportion thereof presented in Table 2.

TABLE 2

|  | Comp. Ex. 1 | Comp. Ex. 2 |
|---|---|---|
| Acrylic rubber | 100 | 100 |
| Stearic acid | 0.5 | 0.5 |
| Red phosphorous | 10 | 20 |
| Aluminum hydroxide | 60 | 50 |
| Crosslinking agent | 0.6 | 0.6 |
| Crosslink accelerator | 1 | 1 |
| Electric conductive agent | 0.3 | 0.3 |

Thereafter, Intermediate Transfer Belt H (Comparative Example 1), and Intermediate Transfer Belt I (Comparative Example 2) were prepared in the same manner as in Examples 1 to 4.

Comparative Example 3, Comparative Example 4, Comparative Example 5

Rubber compositions of Comparative Examples 3 to 5 were prepared in the same manner as in Example 1 to 4 by kneading all the materials, provided that the proportion of each component presented in Table 1 was changed to the proportion thereof presented in Table 3.

TABLE 3

|  | Comp. Ex. 3 | Comp. Ex. 4 | Comp. Ex. 5 |
|---|---|---|---|
| Acrylic rubber | 100 | 100 | 100 |
| Stearic acid | 0.5 | 0.5 | 0.5 |
| Aluminum hydroxide | 150 | 100 | — |
| Zinc boron | — | 20 | — |
| Melamine flame retardant | — | — | 100 |
| Crosslinking agent | 0.6 | 0.6 | 0.6 |
| Crosslink accelerator | 1 | 1 | 1 |
| Electric conductive agent | 0.3 | 0.3 | 0.3 |

Thereafter, Intermediate Transfer Belt J (Comparative Example 3), Intermediate Transfer Belt K (Comparative Example 4), and Intermediate Transfer Belt L (Comparative Example 5) were prepared in the same manner as in Examples 1 to 4.

Comparative Example 6

Intermediate Transfer Belt M was prepared in the same manner as in Example 1, provided that the silicone spherical particles were replaced with irregular-shape silicone particles (TOSPEARL 240 (volume average particle diameter of 2.0 μm); Momentive Performance Materials Inc.).

Comparative Example 7

Instead of the acrylic rubber elastic layer of Example 1, a polyurethane elastic layer was prepared in the following manner.

First, 70 parts by mass of aluminum hydroxide and 20 parts by mass of red phosphorous of Example 1 were added to 100 parts by mass of a base resin RUP-1627 (block isocyanate) of a urethane resin (Urehyper) manufactured by DIC Corporation, and to the resulting mixture 20 parts by mass of dimethyl formamide (DMF) was added as a solvent for adjusting viscosity, followed by sufficiently stirring to disperse the additives therein. Next, 10 parts by mass of a curing agent CLH-5 (amine curing agent) was added, and the resulting mixture was stirred to thereby prepare a urethane rubber coating liquid.

The prepared urethane rubber coating liquid was spirally applied on the previously prepared polyimide base layer by rotating the cylindrical support on which the polyimide base layer had been formed, and continuously ejecting the urethane rubber coating solution from a nozzle while moving the nozzle along the axial direction of the support. As for the coating amount, the amount of the rubber solution was adjusted so that the average thickness of the final elastic layer was to be 500 μm. Thereafter, the metal mold was placed in a hot air circulating dryer with continuously rotating, and heated to 150° C. at the heating rate of 4° C./min and then subjected to a heating treatment for 60 minutes. Thereafter, it was taken out from the dryer, and then cooled. Using a powder supplying device of FIG. 5 and a press member, silicone spherical particles (TOSPEARL 120 (volume average particle diameter of 2.0 μm); Momentive Performance Materials Inc.) were evenly spread as spherical particles on the surface of the resulting layer on the cylindrical support, and the press member of a polyurethane blade was pressed against the spherical particles at the press force of 100 mN/cm to fix the spherical particles in the elastic layer, to thereby produce Intermediate Transfer Belt N.

Each of Intermediate Transfer Belts A to N of Examples and Comparative Examples was mounted in the image forming apparatus (imagio MP C7501, manufactured by Ricoh Company Limited) illustrated in FIG. 2, images were formed on paper having irregularities on a surface thereof (Lezac 260 [kg] paper) in two environments including the environment of 10° C., 15% RH (hereinafter, referred to as "LL"), and the environment of 23° C., 50% RH (hereinafter, referred to as "MM"), and image quality (toner transfer properties of two color, cyan, magenta, blue solid image) on paper was visually observed and evaluated based on ranks. As for the ranks, "A" was very good, "B" was the level applicable on the practical use, "C" was the density of the solid image in the recess portion in the surface was low, and insufficient, and "D" was the level which was unusable. Moreover, the intermediate transfer belt of each of Examples and Comparative Examples was evaluated in terms of the micro rubber hardness, microhardness, surface resistivity, and flame resistance. The results are presented in Tables 4 and 5.

TABLE 4

| | Intermediate transfer belt | Material of surface particles | Particle diameter [μm] | Material of elastic layer | Micro rubber hardness [°] LL | MM | Martens hardness [N/mm$^2$] LL | MM |
|---|---|---|---|---|---|---|---|---|
| Ex. 1 | A | Silicone spherical | 2.0 | Acrylic rubber | 26 | 24 | 0.26 | 0.25 |
| Ex. 2 | B | Silicone spherical | 2.0 | Acrylic rubber | 31 | 27 | 0.30 | 0.29 |
| Ex. 3 | C | Silicone spherical | 2.0 | Acrylic rubber | 26 | 24 | 0.26 | 0.25 |
| Ex. 4 | D | Silicone spherical | 2.0 | Acrylic rubber | 36 | 24 | 0.31 | 0.25 |
| Ex. 5 | E | Silicone spherical | 4.7 | Acrylic rubber | 26 | 24 | 0.26 | 0.25 |
| Ex. 6 | F | Silicone spherical | 6.0 | Acrylic rubber | 26 | 24 | 0.26 | 0.25 |
| Ex. 7 | G | Acryl spherical | 1.0 | Acrylic rubber | 26 | 24 | 0.26 | 0.25 |
| Comp. Ex. 1 | H | Silicone spherical | 2.0 | Acrylic rubber | 47 | 40 | 0.39 | 0.38 |
| Comp. Ex. 2 | I | Silicone spherical | 2.0 | Acrylic rubber | 44 | 38 | 0.33 | 0.32 |
| Comp. Ex. 3 | J | Silicone spherical | 2.0 | Acrylic rubber | 87 | 81 | 1.53 | 1.41 |
| Comp. Ex. 4 | K | Silicone spherical | 2.0 | Acrylic rubber | 81 | 76 | 1.34 | 1.31 |
| Comp. Ex. 5 | L | Silicone spherical | 2.0 | Acrylic rubber | 75 | 68 | 1.13 | 1.12 |
| Comp. Ex. 6 | M | Silicone irregular | 2.0 | Acrylic rubber | 26 | 24 | 0.26 | 0.25 |
| Comp. Ex. 7 | N | Silicone spherical | 2.0 | Urethane rubber | 80 | 70 | 1.31 | 1.15 |

TABLE 5

| | Resistivity change with environment LL-MM (digit) | Flammability test UL94-VTM | Flammability test UL94-V | Transfer ability on irregular-surface paper LL | MM |
|---|---|---|---|---|---|
| Ex. 1 | 1.11 | VTM-0 | V-0 | A | A |
| Ex. 2 | 1.32 | VTM-0 | V-0 | A | A |
| Ex. 3 | 1.12 | VTM-0 | V-0 | A | A |
| Ex. 4 | 1.48 | VTM-0 | V-0 | B | A |
| Ex. 5 | 1.15 | VTM-0 | V-0 | A | A |
| Ex. 6 | 1.19 | VTM-0 | V-0 | B | B |
| Ex. 7 | 1.21 | VTM-0 | V-0 | A | A |
| Comp. Ex. 1 | 1.84 | VTM-0 | V-0 | D | B |
| Comp. Ex. 2 | 1.68 | VTM-0 | V-0 | C | B |
| Comp. Ex. 3 | 2.22 | VTM-0 | V-0 | D | D |
| Comp. Ex. 4 | 2.04 | NG | NG | D | D |
| Comp. Ex. 5 | 1.58 | NG | NG | D | D |
| Comp. Ex. 6 | 1.11 | VTM-0 | V-0 | D | C |
| Comp. Ex. 7 | 2.55 | VTM-1 | V-1 | D | D |

It was found from the results above that designing the structure of the intermediate transfer belt to have the structures of Examples 1 to 7 realized to provide an intermediate transfer belt having excellent transfer ability to paper having irregularities on its surface, and having flame resistance without degrading the transfer ability influenced by the fluctuations of the environmental conditions such as temperature and humidity, and to provide an image forming apparatus equipped with the intermediate transfer belt, especially an image forming apparatus of an intermediate transfer system, which would be suitable for full-color image formation.

As described above, according to the embodiment of the present invention, the intermediate transfer belt contains a base, an elastic layer formed on the base, and spherical particles deposited on a surface of the elastic layer, in which the elastic layer has micro rubber hardness of 40° or lower in the environment of 10° C. and 15% RH, and the intermediate transfer belt is designed to be mounted in an image forming apparatus. As clearly explained through the experiments above, the intermediate transfer belt has excellent transfer ability without causing unevenness in image density on images transferred from the intermediate transfer belt to paper having irregularities on a surface thereof (Lezac 260 [kg] paper), which is a recording medium having irregularities on its surface.

According to the embodiment of the present invention, a difference between surface resistivity of a surface of the intermediate transfer belt at the side of the elastic layer measured in the environment of 10° C. and 15% RH and surface resistivity thereof measured in the environment of 23° C. and 50% RH is within 1.5 digits or smaller, and the elastic layer has micro rubber hardness of 35° or lower in the environment of 23° C. and 50% RH. Therefore, excellent transfer ability can be attained without degrading the transfer ability influenced by the fluctuations in the environmental conditions such as the temperature and humidity. Note that, "digits" express a difference in the logarithm of the surface resistivity.

According to the embodiment of the present invention, moreover, the elastic layer contains acrylic rubber, a metal hydroxide compound, and a red phosphorous compound, and the elastic layer exhibits V-0 in UL94-V flammability test, or VTM-0 in UL94-VTM flammability test. Use of the metal hydroxide compound and the red phosphorous is preferable because they have fewer loads to the environment while giving the flame resistance to the acrylic rubber, which is the elastic layer, they are inexpensive, and the resulting elastic layer hardly loses flexibility (deformability).

According to the embodiment of the present invention, an amount of the metal hydroxide compound is 10 parts by mass to 40 parts by mass relative to 100 parts by mass of the acrylic rubber, and an amount of the red phosphorous compound is 10 parts by mass to 25 parts by mass relative to 100 parts by mass of the acrylic rubber. As a result, an intermediate transfer belt having flexibility of the elastic layer as well as having the flame resistance can be provided. On the other hand, when the amounts thereof are smaller than the lowest limit, the flame resistance cannot be attained. When the amounts thereof are greater the upper limit, the micro rubber hardness of the resulting elastic layer may become higher than 40°.

According to the embodiment of the present invention, the metal hydroxide compound is aluminum hydroxide. As a result, a change in the hardness or resistivity influenced by the fluctuations of the environmental condition is small, such as in the low temperature low humidity environment or high temperature high humidity environment, and hence use of the aluminum hydroxide is preferable.

According to the embodiment of the present invention, the spherical particles are silicone spherical particles. As a result, the spherical particles have lubricity, gives releasing properties to the toner, and has a high function of giving abrasion resistance, and therefore use of the silicone spherical particles as the spherical particles is preferable.

According to the embodiment of the present invention, the spherical particles preferably have the volume average particle diameter of 0.5 μm to 5.0 μm. When the volume average particle diameter of the spherical particles is smaller than 0.5 μm, the effect of improving the transfer performance owing to the spherical particles cannot be sufficiently attained. When the volume average particle diameter of the spherical particles is 5.0 μm or greater, the surface roughness of the resulting intermediate transfer belt becomes large, and a space between the spherical particles becomes large, which may cause a case where the toner is not desirably transferred, or cause cleaning failures.

According to the embodiment of the present invention, the intermediate transfer belt is a seamless belt. As a result, at the same time as improving the durability, excellent image formation can be realized.

According to the embodiment of the present invention, the image forming apparatus, contains: an image bearing member capable of bearing a latent image; a developing unit configured to develop the latent image formed on the image bearing member with a toner to form a toner image; an intermediate transfer member onto which the toner image formed by the developing unit is primary transferred; and a transfer-ring unit transferring unit configured to secondary transfer the toner image on the intermediate transfer member to a recording medium, where the intermediate transfer member is the intermediate transfer belt of the present invention. As a result, as clearly explained through the experiments above, excellent image formation can be performed without causing unevenness in image density of images formed on paper having irregularities on its surface. Especially, the intermediate transfer belt of the present invention can be suitably used for a full-color image forming apparatus of an intermediate transfer system, which contains a plurality of the developing units and a plurality of the latent image bearing members corresponding to a plurality of color toners, where each developing unit and each latent image bearing member respectively correspond to the toner of the respective color, and in which the latent image bearing members are provided along the intermediate transfer belt.

What is claimed is:

1. An intermediate transfer belt, comprising:
a base;
an elastic layer formed on the base; and
spherical particles deposited on a surface of the elastic layer,
wherein the elastic layer has micro rubber hardness of 40° or lower in the environment of 10° C. and 15% RH, and the intermediate transfer belt is designed to be mounted in an image forming apparatus, and
wherein the spherical particles are partially embedded in the elastic layer.

2. The intermediate transfer belt according to claim 1, wherein a difference between surface resistivity of a surface of the intermediate transfer belt at the side of the elastic layer measured in the environment of 10° C. and 15% RH and surface resistivity thereof measured in the environment of 23° C. and 50% RH is within 1.5 digits or smaller, and the elastic layer has micro rubber hardness of 35° or lower in the environment of 23° C. and 50% RH.

3. The intermediate transfer belt according to claim 1, wherein the elastic layer contains acrylic rubber, a metal hydroxide compound, and a red phosphorous compound, and wherein the elastic layer exhibits V-0 in UL94-V flammability test, or VTM-0 in UL94-VTM flammability test.

4. The intermediate transfer belt according to claim 3, wherein an amount of the metal hydroxide compound is 10 parts by mass to 40 parts by mass relative to 100 parts by mass of the acrylic rubber, and an amount of the red phosphorous compound is 10 parts by mass to 25 parts by mass relative to 100 parts by mass of the acrylic rubber.

5. The intermediate transfer belt according to claim 3, wherein the metal hydroxide compound is aluminum hydroxide.

6. The intermediate transfer belt according to claim 1, wherein the spherical particles are silicone spherical particles.

7. The intermediate transfer belt according to claim 1, wherein the spherical particles have the volume average particle diameter of 0.5 μm to 5.0 μm.

8. The intermediate transfer belt according to claim 1, wherein the intermediate transfer belt is a seamless belt.

9. An image forming apparatus, comprising:
an image bearing member capable of bearing a latent image;
a developing unit configured to develop the latent image formed on the image bearing member with a toner to form a toner image;
an intermediate transfer member onto which the toner age formed by the developing unit is to be primary transferred; and
a transferring unit configured to secondary transfer the toner image on the intermediate transfer member to a recording medium,
wherein the intermediate transfer member contains:
a base;
an elastic layer funned on the base; and
spherical panicles deposited on a surface of the elastic layer,
wherein the elastic layer has micro rubber hardness of 40° or lower in the environment of 10° C. and 15% RH, and
wherein the spherical particles are partially embedded in the elastic layer.

10. The image forming apparatus according to claim 9, wherein the image forming apparatus is a full-color image forming apparatus containing a plurality of the developing units and a plurality of the latent image bearing members corresponding to a plurality of color toners, where each developing unit and each latent image bearing member respectively correspond to the toner of the respective color, and
wherein the latent image bearing members are provided along the intermediate transfer belt.

* * * * *